United States Patent [19]
Holzer

[11] 4,383,418
[45] May 17, 1983

[54] CIRCULATOR PUMP FOR CONVEYING A LIQUID AND/OR GASEOUS MEDIUM

[76] Inventor: Walter Holzer, Drosteweg 19, 7758 Meersburg, Fed. Rep. of Germany

[21] Appl. No.: 224,507
[22] PCT Filed: Jun. 10, 1980
[86] PCT No.: PCT/EP80/00036
  § 371 Date: Dec. 9, 1980
  § 102(e) Date: Dec. 9, 1980
[87] PCT Pub. No.: WO80/02869
  PCT Pub. Date: Dec. 24, 1980

[30] Foreign Application Priority Data
Jun. 11, 1979 [DE] Fed. Rep. of Germany ....... 2923621

[51] Int. Cl.³ .......................... F04B 17/00; F24J 3/02
[52] U.S. Cl. .................................. 62/235.1; 126/432; 165/22; 417/393
[58] Field of Search ....................... 126/432, 436, 433; 165/104, 22; 417/207–209, 393; 62/235.1

[56] References Cited
U.S. PATENT DOCUMENTS

2,986,907 6/1961 Hoop ........................ 417/393 UX
4,300,540 11/1981 Gray ............................ 417/377 X
4,304,529 12/1981 Gerich ......................... 417/393 X Primary Examiner—William E. Wayner
Attorney, Agent, or Firm—Birch, Stewart, Kolasch and Birch

[57] ABSTRACT

A circulator pump for a plant for the utilization of solar heat including a first heat exchanger for collecting heat at a high level disposed within a solar collector, a medium for receiving heat collected in the first heat exchanger, a second heat exchanger for collecting heat at a lower level with respect to the first heat exchanger and a circulator pump for circulating the medium through the first and second heat exchangers. The circulator pump is a prime mover driven by a pressure difference between the first and second heat exchangers and is a charger pump. The prime mover and charger pump operating in a push-pull manner as differential piston pumps having a common piston rod operatively disposed within a chamber including control ducts, which load an auxiliary control slider member. The auxiliary control slider member is reciprocated within a chamber and upon reaching end portions of the differential piston switch the chambers of the two differential piston pumps to effect oppositely directed movement.

14 Claims, 5 Drawing Figures

CIRCULATOR PUMP FOR CONVEYING A LIQUID AND/OR GASEOUS MEDIUM

SUMMARY AND OBJECTS OF THE INVENTION

The invention relates to a circulator pump for conveying a liquid and/or gaseous medium in a closed circuit in which a heat exchanger is located to which heat is supplied from outside, e.g. energy from the sun, and which supplies this heat to another heat exchanger by means of the medium to be circulated, the other heat exchanger delivering heat, e.g. for purposes of heating.

It is an object of the invention to construct the drive of the circulator pump in such a manner that no external energy, such as electric current or mechanical drive, is required. Furthermore as large a volume as possible is pumped through the circuit for a small internal consumption.

The solution of the problem resides in providing a circulator pump which is driven by itself by utilization of the temperature drop prevailing between its input and its output and by the expansion pressure resulting therefrom, and is formed by two differential piston pumps which are mechanically connected together and which are alternately loaded by the medium by means of an automatic control device.

Owing to the use of the medium to be circulated as a drive for the circulator pump, independence from external energy is obtained. In combination therewith it is attained by the use of an automatic control device with differential pistons, wherein a minimum of diverted energy is sufficient for the drive, so that a very good degree of efficiency of the installation is still present.

A relatively large step-up ratio of the differential piston can ensure in a simple manner that only a small volume is required for the drive of the pump, in contrast thereto, however, a large volume is pumped through the circuit. In this case a medium is always pumped from a heat store of higher temperature to a heat store for the delivery of the energy to a lower temperature level. The conveyed quantity of liquid is to be relatively large in proportion to the quantity of liquid which is required for the actuation of the differential piston pumps which the circulator pump constitutes.

Furthermore it is essential that the input loaded by the medium of higher temperature, of the differential piston pumps is alternately connected by the automatic control device to the chambers which comprise the larger volume because of the larger piston areas of the differential piston pumps.

Furthermore it is proposed according to the invention to construct such a thermal drive based on a temperature drop, consisting of at least one heat exchanger system which is filled with liquid and/or gaseous media, one prime mover which is driven by these media, and one charging pump which feeds media to the system, by the use of two differential piston pumps which operate in push-pull. The pistons of these differential piston pumps are connected together by a common piston rod. The piston rod carries control ducts which load an auxiliary control slider member. As soon as the differential pistons reach their end positions, the control ducts of the piston rod load the auxiliary control slider member which in turn switches the chambers of the two differential piston pumps to oppositely directed movement.

It is advantageous to construct the invention in such a manner that the heat exchanger system is always connected to the two chambers of the same differential piston pump, the same pressure prevails at the piston from both sides, so that special sealing measures can be omitted. In particular expensive seals which would be subjected to wear may be dispensed with.

A further embodiment of the invention resides in the arrangement of at least one piston on the reciprocatory auxiliary control slider member, the piston operating as a double-acting pump.

Since both systems, that is to say the differential piston pumps and the auxiliary control slider member with its piston, perform a reciprocatory movement, this double-acting pump at the auxiliary control slider member may be utilized for various additional functions, e.g. for preliminarily compressing the medium before it is fed to the heat store again by the differential piston pumps, or for constructing multiple-stage compression cooling installations.

It is unimportant in this case whether the double-acting pump is controlled in a known manner by inlet valves and outlet valves or, as envisaged by a further embodiment of the invention, whether the double-acting pump, too, is controlled by additional control ducts on the piston rod of the differential pistons. Naturally all measures which improve the degree of efficiency or the possibilities of use apply to the further development of the invention.

This involves inter alia the presence of a second heat exchanger system in which the issuing medium is cooled and returned again to the differential pump. Also it is particularly advantageous to construct the first heat exchanger system directly in the form of a solar collector, wherein the second heat exchanger system could be a heat store.

According to the invention, the employment of such a thermal drive also directly as part of an absorption cooling system is proposed, wherein the first heat exchanger system would be the ejector and the second heat exchanger system is constructed as a cooling circuit with condenser, evaporator and absorber. Particular significance is attached to the proposal according to the invention to construct the thermal drive in such a manner that the ejector is constructed directly in the form of a solar collector.

Likewise it is proposed according to the invention to construct the second heat exchanger system in the form of a compressor cooling circuit in which at least one condenser, one relief valve and one evaporator are present.

Also it is proposed according to the invention to utilize the additional arrangement of a double-acting piston pump on the auxiliary control slider member for the construction of a multiple-stage compressor circuit. This pump could serve e.g. for liquefying the medium which has become gaseous in the evaporator. The medium is not supplied in liquefied form to the actual differential piston pump until after compression in the double-acting piston pump.

A further improvement of the degree of efficiency may be obtained in accordance with the invention in that if a further heat exchanger is present the first "hot" circuit of which is arranged at the "hot" output of the differential piston pumps, and the "cold" circuit of which lies at the "cold" output of the differential piston pump. In this arrangement a certain quantity of heat is already removed from the hot issuing medium and supplied directly to the cooled medium which is fed e.g. to the solar collector for the purpose of further heating.

BRIEF DESCRIPTION OF THE DRAWINGS

The invention will be described further, by way of example, with reference to the accompanying diagrammatic drawings, in which.

DETAILED DESCRIPTION OF THE INVENTION

Figure 1:
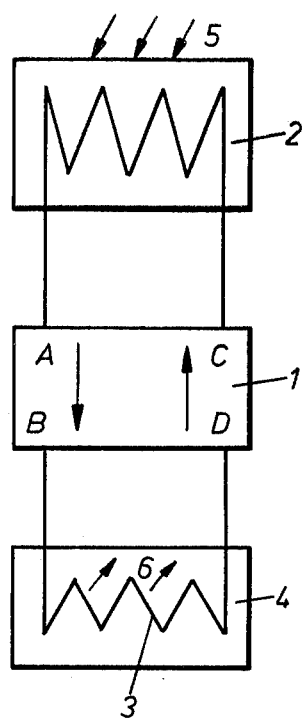
FIG. 1 shows a circulating pump in a fluid medium circuit including two heat exchangers.

In order to permit the functioning of the thermal prime mover consisting of two differential piston pumps to be explained in a better manner, the principle of such an arrangement is illustrated diagrammatically in FIG. 1.

The actual thermal prime mover or the circulator pump, respectively, with its own drive 1 is connected on the one hand to a first heat exchanger 2 (e.g. a solar collector). On the other hand a connection exists to a second heat exchanger 3 which is located in a heat store 4. It is then an object of the thermal prime mover, or the circulator pump 1, respectively, to feed the energy supplied to the first heat store 2, e.g. solar energy 5, initially to the second heat exchanger 3, which supplies the same as store heat 6 to the heat store 4.

The medium located in the pipelines of the heat exchanger 2 is heated by the solar energy 5 and will affect the thermal prime mover, or the circulator pump 1, respectively, by way of the connections A and C at the same pressure. On the other hand the second heat exchanger is connected by way of the connections B and D to the thermal prime mover, or the circulator pump, respectively, in order to cool in the solar collector, by delivery of the store heat 6. In the construction according to the invention of the thermal prime mover, or the circulator pump, respectively, there results a flow circulation in the direction of the arrow between the connections A and B, or C and D, respectively. The heated medium flows in this case from A to B, and the cooled medium flows from D to C. For the purpose of simplification, the following denominations are used for the connections A, B, C, and D:

A—"hot" input of the differential piston pumps of the circulator pump 1

B—"hot" output of the differential piston pumps of the circulator pump 1

C—"cold" output of the differential piston pumps of the circulator pump 1

D—"cold" input of the differential piston pumps of the circulator pump 1

Figure 2:
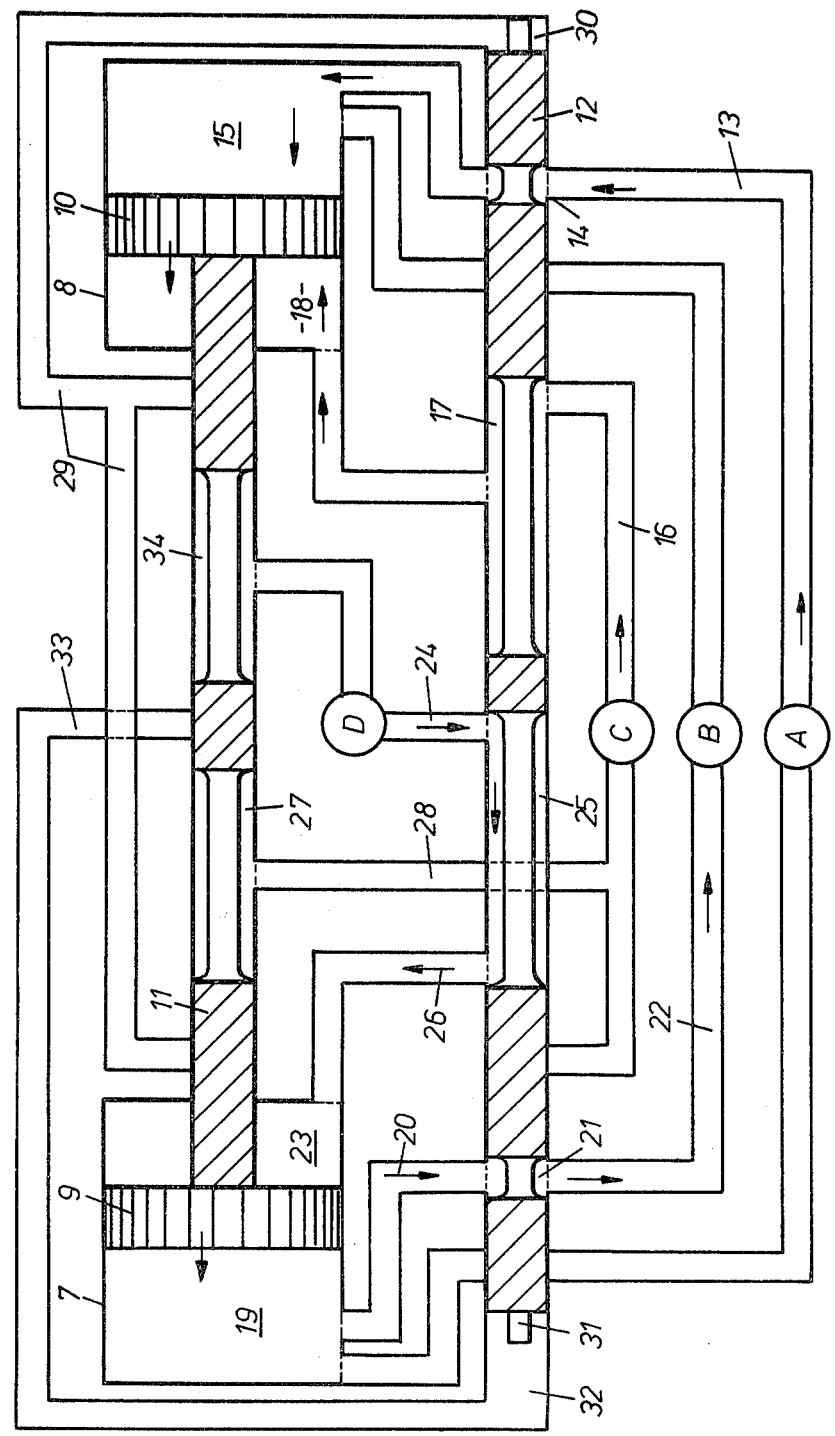
FIG. 2 shows an embodiment of the circulating pump.

FIG. 2 illustrates by way of example the internal construction of a differential piston pump according to the invention with the corresponding control ducts.

The most important constructional component parts of a prime mover, or a circulator pump, respectively, according to the invention are the two differential piston pumps 7 and 8 with their pistons 9 and 10. The two pistons 9 and 10 are connected together by means of the piston rod 11. In the embodiment illustrated, the automatic control device is formed by the auxiliary control slider member 12. In accordance with the foregoing description, the inputs and outputs of the prime mover, or the circulator pump, respectively, are denoted by A,B,C and D. The arrows provided at the connections A,B,C and D indicate whether at this connection of the prime mover a medium is supplied thereto or guided away from the circular pump.

In the central position illustrated in FIG. 2, of the differential pistons and the illustrated position of the auxiliary control slider member 12 the hot medium is supplied by connection A through the conduit 13 through the control duct 14 to the chamber 15 of the piston pump 8. On the other hand a pressure of the same magnitude affects the opposite chamber 18 of the piston pump 8 from the connection C through the conduit 16 and the control duct 17 and thereby affects the other side of the piston 10. Although the same pressure prevails in the chamber 15 and in the chamber 18, nevertheless a resulting force acts on the piston 10, since the piston areas of the chambers 15 and 18 differ by the difference of the area of the piston rod 11. The piston rod 11 is pushed to the left by this differential force and thereby conveys the medium located in the chamber 19 through the conduit 20, the control duct 21 and the conduit 22 to the "hot" output B. At the same time medium coming from the connection D flows through the conduits 24 and 26 through the control duct 25 into the chamber 23 of the piston pump 7.

As soon as the pistons 9 and 10, and together therewith the piston rod 11 have reached approximately the left-hand end position, the control duct 27 establishes through the conduits 28 and 29 a connection between the connection C and the right-hand end 30 of the auxiliary control slider member 12. The pressure prevailing at the connection C will then move the auxiliary control slider member 12 to its left-hand end position, until the abutment 31 limits the stroke. Therein the control ducts 14 and 21 will initially perform the change-over from the connection A from the chamber 15 to the chamber 19. Likewise the chamber 18 is then connected through the control duct 17 to the connection D and the chamber 23 is connected through the control duct 25 to the connection C.

The pressure conditions in the chamber 19 and 23 are now reversed, that is to say there remains a resultant force upon the piston rod 11 in the direction to the right, and the piston 9 and 10 with piston rod 11 will move to the right-hand end position. However, upon reaching the right-hand end position the connection C is connected through the control duct 27 to the left-hand end 32 of the auxiliary control slider member 12 by way of the conduit 33, and at the same time the right-hand end 30 of the auxiliary control slider member is connected through the control duct 34 to the connection D.

Since a higher pressure prevails at the connection C than at the connection D, the auxiliary control slider member 12 will now move to its right-hand position, such as illustrated in FIG. 2. Thereby all the parts are subjected again to the pressure conditions described hereinbefore, and the two pistons 9 and 10 with piston rod 11 will move to the left again.

In this case it is generally assumed that in consequence of the heating of the medium in the heat exchanger 2 a higher pressure prevails at the connection A and C than at the connections B and D where, in consequence of the cooling of the medium in the heat store 3, a reduction of the volume and thereby a decrease of pressure takes place.

Figure 3:
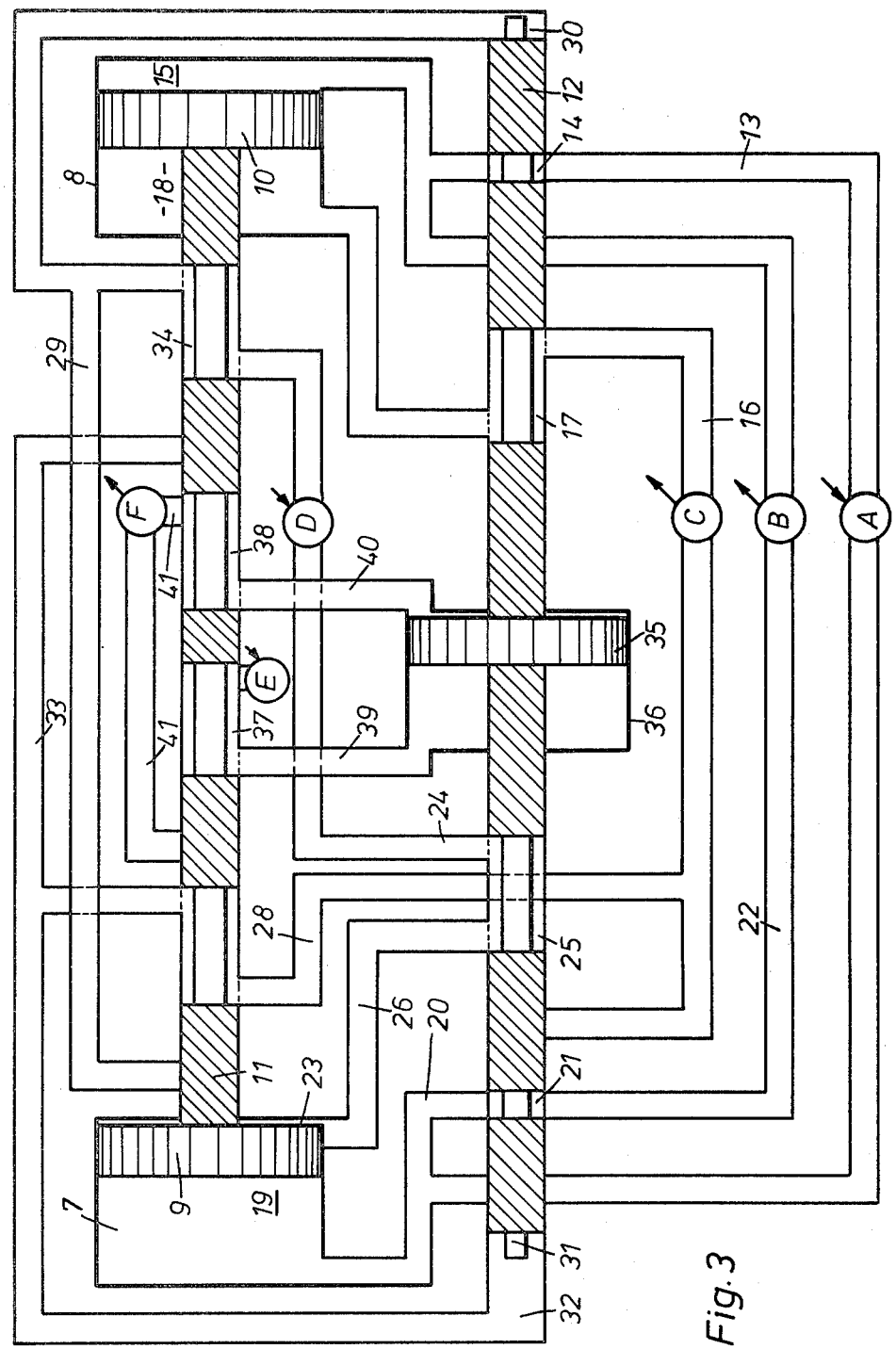
FIG. 3 shows another embodiment of the circulating pump.

A further embodiment is illustrated in FIG. 3. Therein the same parts as in FIG. 2 are denoted by the same reference numerals.

Additionally, in FIG. 3, the piston 35 is arranged at the auxiliary control slider member 12 and reciprocates together with the auxiliary control slider member 12 in the pump casing 36.

In co-operation with the control ducts 37 and 38 which are additionally arranged on the piston rod 11, and the conduits 39, 40 and 41, this arrangement constitutes a double-acting pump which sucks in at the connection E and ejects at the connection F.

In case a compulsory control, such as provided in this case by the control ducts 37 and 38, should not be desirable, inlet valves and outlet valves each of which cuts off in one direction, may obviously be substituted in a known manner for this double-acting pump.

The diagrammatic illustration in FIG. 1 shows a typical use of the invention and the advantages thereof.

The medium which has been heated by the solar energy 5 in the heat exchanger 2 (illustrated in this case as a solar collector) is pumped by the thermal prime mover, or the circulator pump 1, respectively, to the heat store 4 which in most cases is located at a lower level, where the heat 6 to be stored is delivered by the heat exchanger 3 to the surrounding liquid, e.g. a float basin or a hot water storage container.

Figure 4:
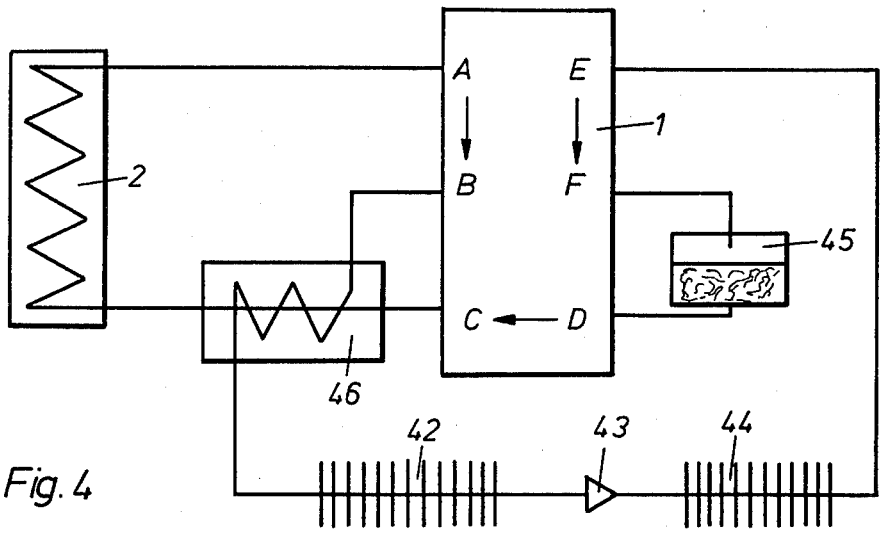
FIG. 4 shows an alternative fluid medium circuit.

FIG. 4 illustrates diagrammatically an arrangement of the thermal drive as a cooling machine. In this case the heat store 2 is to be thought of as the ejector of an absorption refrigerator in which e.g. an ammonia-water mixture or another liquid combination capable of absorption having as large a co-efficient of expansion as possible is heated. Owing to the increase in volume occurring thereby the differential piston pumps of the prime mover, or the circulator pump 1, respectively, are moved and the gas-liquid mixture issuing at the connection B is fed to a condenser 42 where the temperature drops. The mixture now cooled travels through the subsequent restrictor 43 into the evaporator 44 from where it enters into the double-acting piston pump at the connection E and travels compressed into an absorption vessel 45 through the connection F. Finally the "cold" solution is supplied by the absorption vessel 45 through the connection D to the differential piston pumps and arrives again through the connection C in the heat exchanger 2.

For the purpose of improving the degree of efficiency, the interposition of a heat exchanger 46 is provided in FIG. 4; on the one hand this heat exchanger 46 extracts heat from the "hot" medium issuing at the connection B in that it supplies the heat to the medium which issues "cold" at the connection C.

The diagrammatic illustration of FIG. 4 illustrates only one of the numerous possibilities which are possible at the present state of the art in the construction of absorption cooling machines.

Other variants of the absorption cooling technique, such as e.g. the separation of ammonia and water and separate pumping around by means of the double-acting piston pump are also possible, as well as the use of other cooling or refrigeration means which are especially suitable for this method.

Likewise, the diagram FIG. 4 may be understood to be the circuit of a compression refrigerator in which first a suitable cooling means is thermally compressed, then slightly cooled, wherein after pressure relief in a restrictor 43 heat is extracted from the surroundings by the evaporator 44 and is cooled thereby. In this case the double-acting piston pump is afforded the task of preliminary compression and liquefication of the medium.

In the embodiment of the heat exchanger 2 as solar collector the invention acquires particular importance, since refrigerators and air conditioners may be constructed directly without any external energy such as electrical current and the like.

Also for the utilization of waste heat, such as wasted e.g. to the atmosphere by the radiator or the exhaust system of motor vehicles, new possibilities are opened by this invention, since no additional energy is taken from the motor for the operation of the cooling installation.

Particular attention is to be directed to a special property of the thermal drive according to the invention. The feed power of the differential piston pumps results from the ratio of the volume of the medium at different temperatures. If for example a liquid of 20° ambient temperature expands by 20% upon heating to 50° and accordingly the volume of the differential piston pumps are designed differing by 20%, the thermal prime mover, or circulator pump, respectively, will endeavour to maintain the temperature difference of 30°. If then, e.g. owing to increased sun irradiation, an increased rise of volume occurs, a correspondingly faster movement of the differential pistons will occur with the consequence that more cooled medium is pumped into the solar collector, namely until an expansion difference of 20% is adjusted again between the expansion in the solar collector and the cooling in the heat store.

A particularly advantageous automatic control of the system results from the use of media, such as refrigerant 22 (chlorodifluoromethane) have the property to possess an increasing co-efficient of expansion at increasing temperature. Thereby an accelerated pumping frequency occurs upon rising temperature in the solar collector, and with strong irradiation by the sun it is in a position to convey an increased quantity of heat. On the other hand, when such media are used, it is possible to charge up the heat store to temperatures which approach more closely the temperature of the solar collector, since the same volume difference is given already at lower temperature differences.

In order to avoid overheating the installation in the case of extremely strong radiation from the sun and with the heat store already "full", it is recommended in accordance with the invention to provide a safety device which, when a critical temperature in the first or/and the second heat exchanger is exceeded, inserts an additional safety heat exchanger cooled by air or water, for the purpose of cooling the medium.

Figure 5:
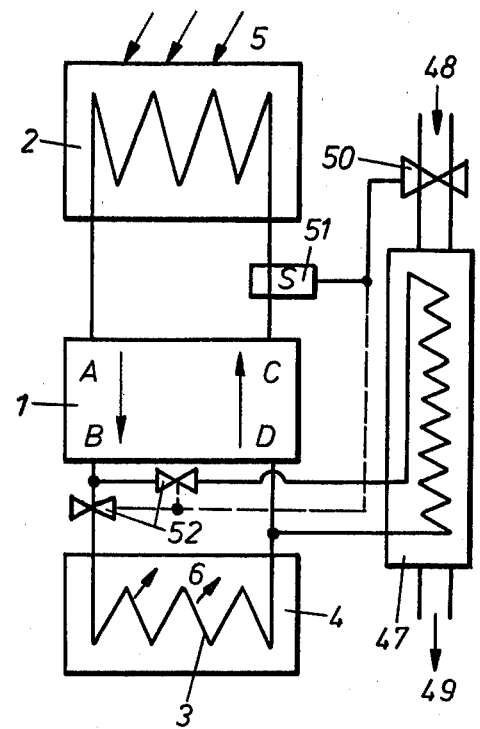
FIG. 5 shows a modification of the circuit of FIG. 1.

In this connection FIG. 5 provides a constructional example, the same parts again being denoted by the same reference numerals. Additionally a safety heat exchanger 47 is provided which possesses e.g. a water inlet 48 and a water outlet 49. A valve 50 normally cuts off the water passage. When the temperature of the medium of the heat exchanger 2 exceeds a certain limit value, the thermostat 51 switches and opens the valve 50. Thereby cold water is caused to flow through the safety heat exchanger 47 and carries away the excess heat. An additional measure may reside in that a thermostatically controlled double valve 52 is arranged at the output B and blocks the direct flow of the medium from B to the heat exchanger 3 and, in the case of danger, guides the entire flow through the safety heat exchanger 47.

The illustrations in FIGS. 1 to 5 are to be regarded as solutions of the principle, or as examples, respectively, which may be enlarged in any desired manner in accordance with the state of the art. For example, in place of the safety heat exchanger 47 which is illustrated as a water-cooled heat exchanger in FIG. 5, alternatively a safety heat exchanger may be provided which is constructed in the form of an air cooler. Similarly, the temperature in the heat store 4 or even both temperatures of the heat exchangers 2 and 4 may serve as critical measuring quantity for the thermostat 51.

However, further directions important for the invention are clear from the illustrations of the principle in FIG. 1 to FIG. 5 and must be regarded as instruction for technical action.

I claim:

1. A circulator pump for a plant for the utilization of solar heat comprising:
    a first heat exchanger for collecting heat at a high level disposed within a solar collector;
    a medium for receiving heat collected in said first heat exchanger;
    a second heat exchanger for collecting heat at a lower level with respect to said first heat exchanger;
    a circulator pump for circulating said medium through said first and second heat exchangers;
    said circulator pump being a prime mover driven by a pressure difference between said first and second heat exchangers and being a charger pump, said prime mover and charger pump operating in a push-pull manner as differential piston pumps having a common piston rod operatively disposed within a chamber including control ducts, which load an auxiliary control slider member;
    said auxiliary control slider member being reciprocated within a chamber and upon reaching end portions of said differential piston switch the chambers of the two differential piston pumps to effect oppositely directed movement.

2. Circular pump according to claim 1, wherein the heat exchanger system is always connected to the two chambers of the same differential piston pump.

3. Circulator pump according to claim 1, or 2, wherein said auxiliary control slider member includes at least one piston which is the piston of a double-acting pump.

4. Circulator pump according to claim 3, wherein the double-acting pump includes inlet valves and outlet valves.

5. Circulator pump according to claim 3, wherein a piston rod of the differential piston pump is provided with control ducts for reversing the double-acting pump.

6. Circulator pump according to claim 1, or 2, wherein the medium issuing from the differential piston pumps is cooled in the second heat exchanger and fed again to the pump.

7. Circulator pump according to claim 1, or 2, wherein the second heat exchanger system is constructed in the form of a compressor cooling circuit which comprises at least one condenser, one relief valve and one evaporator.

8. Circulator pump according to claim 1, or 2, wherein the first heat exchanger system is the ejector of an absorption cooling system and the second heat exchanger system is constructed in the form of a cooling circuit with a condenser, an evaporator and an absorber.

9. Circulator pump according to claim 8, wherein the ejector is constructed in the form of a solar collector.

10. A circulator pump according to claim 1, wherein the auxiliary control slider member connects an input for the hotter medium alternately to piston pump chambers which are delimited by the piston faces of larger area.

11. Circulator pump according to claims 1, 10 or 2, wherein the double-acting piston pump is part of a multiple-stage compressor circuit.

12. Circulator pump according to claim 1, 10 or 2, wherein said first heat exchanger is connected to a first "hot" circuit which is arranged at the "hot" output of the differential piston pumps and a "cold" circuit which is connected to the "cold" output of the differential piston pumps.

13. Circulator pump according to claim 1, 10 or 2, wherein the medium used possesses a coefficient of expansion which increases with increasing heating.

14. Circulator pump according to claim 1, 10 or 2, including a safety device which, when a critical temperature in the first or/and second heat exchanger is exceeded, switches in an additional safety heat exchanger cooled with air or water, for the purpose of cooling the medium.

* * * * *